Sept. 14, 1943.   P. S. BAKER   2,329,177
VENTILATED SPOILER
Filed Dec. 27, 1940
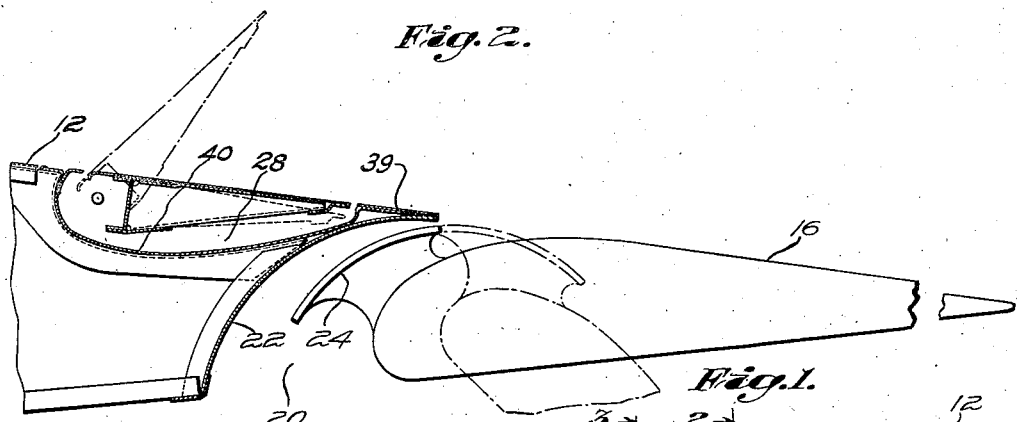
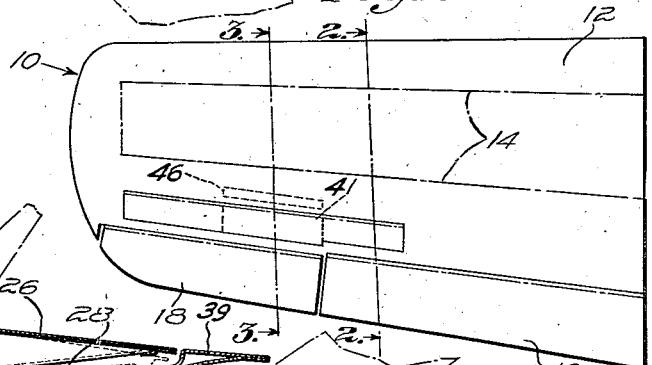
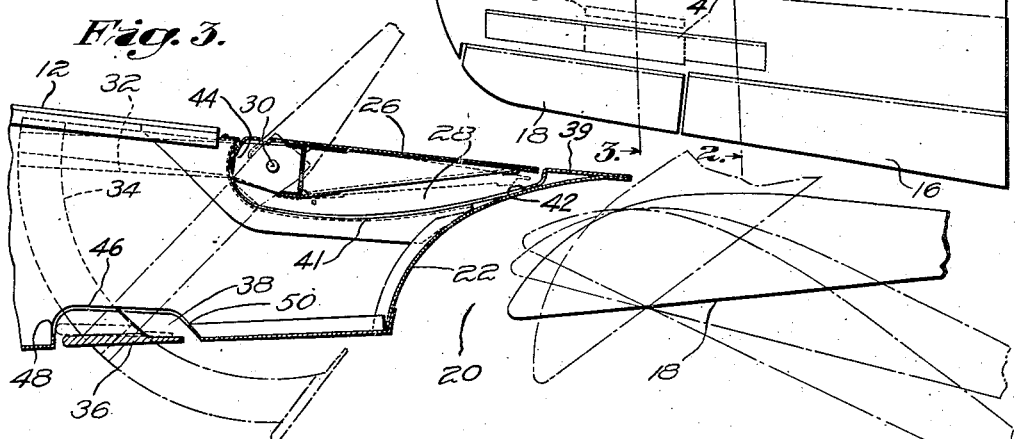
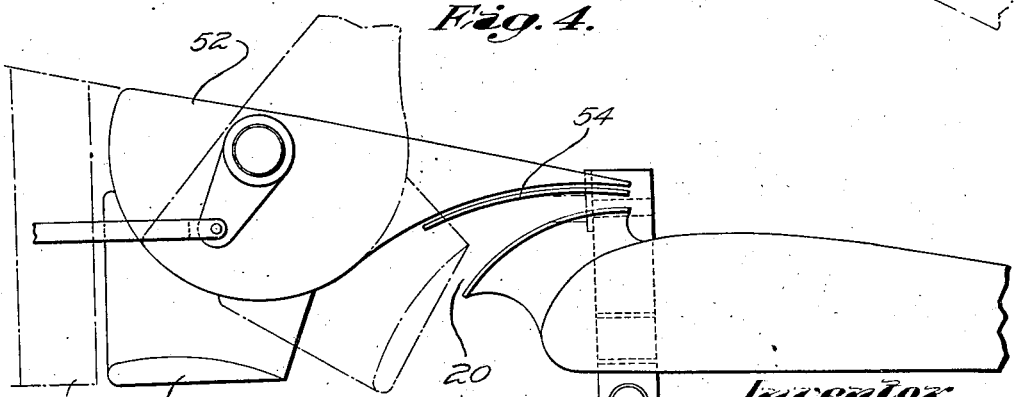
Inventor
Paul S. Baker
by Harris G. Luther
Attorney Patented Sept. 14, 1943

2,329,177

UNITED STATES PATENT OFFICE 2,329,177

VENTILATED SPOILER

Paul S. Baker, Fairfield, Conn., assignor to United Aircraft Corporation, East Hartford, Conn., a corporation of Delaware Application December 27, 1940, Serial No. 371,861

7 Claims. (Cl. 244—42)

This invention relates to improvements in airplane control devices and has particular reference to an improved lateral control device incorporated in the wing of an aircraft.

An object of the invention resides in the provision in an aircraft having a wing equipped with a lift increasing flap separated from the fixed portion of the wing by a flap energizing wing slot and a wing lift spoiler flap carried by said fixed portion ahead of said slot, of means for shielding said lift spoiler flap from the airflow through said wing slot, and a wing gap rendered effective by operation of said lift spoiler flap to admit air to the space beneath and to the rear of said lift spoiler flap to increase the effectiveness of said flap and render the control of the airplane by said lift spoiler flap more sensitive, particularly at small amplitudes of lift spoiler flap movement.

Other objects and advantages will be more particularly pointed out hereinafter or will become apparent as the description proceeds.

In the accompanying drawing, in which like reference numerals are used to designate similar parts throughout, there is illustrated a suitable mechanical arrangement for the purpose of disclosing the invention. The drawing, however, is for the purpose of illustration only and is not ot be taken as limiting or restricting the invention as it will be apparent to those skilled in the art that various changes in the illustrated arrangement may be resorted to without in any way exceeding the scope of the invention.

In the drawing, Fig. 1 is a plan view of the outer end portion of an airplane wing schematically showing the application thereto of a wing lift increasing flap, an aileron, and a wing lift spoiler device constructed according to the invention.

Fig. 2 is a sectional view on an enlarged scale of the rearward portion of the wing illustrated in Fig. 1 taken on the line 2—2 of Fig. 1.

Fig. 3 is a sectional view similar to Fig. 2 taken on the line 3—3 of Fig 1, and Fig. 4 is a sectional view similar to Figs. 2 and 3 showing a somewhat modified form of control mechanism.

Referring to the drawing in detail, the numeral 10 generally indicates an airplane wing, which may have a main relatively fixed portion 12 supported by a suitable spar construction, schematically illustrated as indicated at 14. A wing lift increasing flap 16 is hingedly secured at the rearward edge of the fixed wing portion 12 and extends spanwise along the inner portion of the wing and an aileron 18 is hinged at the rearward edge of the main wing portion between the outer end of the flap 16 and the outer end of the wing.

The wing slot 20 is designed to permit a flow of air from the relatively high pressure space below the wing into the relatively low pressure space above the wing and to convert the static pressure difference of the air at the entrance and exit of the slot into dynamic energy, evidenced by the high speed of the air flow at a slot exit, and to direct this high speed air jet over the upper surface of the lift increasing flap or the upper surfaces of the ailerons to energize the airflow over these upper surfaces and maintain the lift of the flap and ailerons at high angles of attack of these members. Since the flap or aileron is positioned immediately to the rear of the slot it is necessary to direct the air jet issuing from the slot rearwardly over the upper surfaces of the flap and ailerons. If desired, the direction control of this air jet may be assisted by a suitable guide vane carried by the movable flap or aileron and indicated at 24. The construction and operation of the wing slot and guide vane arrangement is particularly illustrated and described in United States Patent No. 2,117,607 issued May 17, 1938 to Roger W. Griswold, II.

In the illustrated arrangement lateral or rolling control of the airplane may be obtained through either of two different sets of instrumentalities acting either entirely independently of each other, or with varying degrees of collaboration. These separate instrumentalities comprise the ailerons, one of which is illustrated and indicated at 18, and the lift spoiler flaps, one of which is illustrated and indicated at 26. The wing lift increasing flap 16 is included between the inner ends of the ailerons at the rear of the fixed wing portion and is tiltable to a downwardly inclined or drooped position to increase the lift of the wing when it is desired to sustain flight at flying speeds below the normal stalling speed of the wing. If desired, the lift increasing effect of the flap 16 may be augmented by simultaneous downward inclination or drooping of both ailerons to provide a lift increasing flap structure for substantially the entire length of the wing and when the ailerons are thus utilized to increase the wing lift the lateral control function may be taken over in part or in total by the lift spoiler flaps. Suitable mechanism for positioning the lift increasing flap and ailerons is particularly illustrated and described in United States Patent No. 2,220,194, issued November 5, 1940, to Frank C. Albright for Aircraft control means. A suitable arrangement for transferring the lateral control function between the ailerons and the lift spoiler flaps is particularly illustrated and described in United States Patent No. 2,201,710 issued May 21, 1940 to Rex B. Beisel et al. for Airplane control, and suitable mechanism for operating the lift spoiler flaps is particularly shown in United States Patent No. 2,181,501, issued November 28, 1939 to Rex B. Beisel for Airplane control devices.

It has been found that certain material advantages inhere in positioning the lift spoiler flaps as near the trailing edge of the wing as practical considerations permit. In the illustrated arrangement this desideratum places the lift spoiler flaps immediately ahead of the wing slot 20. A depression 28 is provided in the upper surface of the wing to receive each of the lift spoiler flaps. The flaps are hinged to the forward edges of the respective depressions as indicated at 30, and, when in their neutral position, have their upper surfaces substantially flush with the upper surface of the wing. Preferably the depressions are made slightly deeper than the thickness of the flaps so that the flaps may move somewhat inwardly of their neutral position just before being projected out of their respective depressions in order to relieve the manual control of the necessity of bringing the flaps from a position of rest into a state of rapid movement with a suddenness that would produce high inertia forces. As explained in United States Patent No. 2,181,501, referred to above, as one flap is being returned to its neutral position the other flap is first moved inwardly or downwardly a slight amount to a position as indicated in dotted lines in Figs. 2 and 3 and is then started up reaching its neutral position at the same time as the manual control is brought to neutral. However, as the upward movement of the flap will have already been started the manual control may be moved through its neutral position without any serious change in the manual effort required. This above described method of operation will indicate the smoothness and sensitivity desired in the lift spoiler control.

Another factor seriously affecting the operation of the lift spoilers is the varying air pressure acting on the lift spoiler flaps as they are moved from their retracted position within the wing cavities to their fully projected position in which they extend above the wing into the airflow over the upper surface of the wing. It has been found possible to effectively counterbalance these air forces by attaching a balancing vane to each spoiler flap in such a manner that the balancing vane is positioned below the wing and is moved from a position within a depression in the undersurface of the wing into the airflow flowing along the wing undersurface as the respective lift spoiler flap is projected into the airflow over the wing upper surfaces. In the accompanying drawing, vane carrying arms are shown secured to the forward portion of the lift spoiler flap and supported with the flap on the pivot 30. Each arm may conveniently comprise a straight portion 32 extending opposite the lift spoiler flap approximately in line with the flap chord and a curved portion 34 extending from the free end of the portion 32 downwardly through the wing to the balancing vane 36. This shape of the arm provides a practical arrangement in which the arms may swing down as the flap is tilted upwardly and the arms will not interfere with the adjacent structural parts of the wing. The balancing vane 36 is normally received in an elongated depression or cavity 38 provided in the lower surface of the wing preferably somewhat ahead of the lift spoiler flap cavity 28 so that the angle of the vane relative to the undersurface of the wing will change from a condition in which the vane is substantially parallel to and flush with the wing undersurface when the lift spoiler flap is in its neutral position to a condition in which the vane is more or less perpendicular to the wing undersurface and the direction of airflow along the undersurface of the wing when the flap is fully extended, this latter position being clearly shown in broken lines in Fig. 3. The cross-sectional shape of the balancing vane 36 and its actual dimensions may be adjusted for the particular installation to achieve the objective of maintaining the stick force, that is, the manual effort necessary to move the lift spoiler flap from its retracted to its fully extended position, below a prescribed maximum value and to insure a smooth graduation of the necessary manual effort as the lift spoiler flap is moved between its retracted and its fully extended position. This does not mean, however, that the stick force should be constant at all angles of the lift spoiler flap as it has been found desirable to have this force increase proportionally to the amount of projection of the flap so that the pilot may at all times sense the amount of control exerted by the lift spoilers by the degree of manual effort required to move the lift spoilers to various angular positions with respect to the wing. For a more complete description of the balancing vane and support therefore reference may be had to United States application Serial No. 371,860, filed December 27, 1940, by Rex B. Beisel, for Balanced spoilers, and assigned to the assignee of the present invention.

In addition to the inertia of the lift spoiler flaps and the variations in the air forces acting thereon as the flaps are moved between their neutral and extended positions, there are other factors which seriously affect the smoothness and sensitivity of the control by these members and it is among the objects of this invention to overcome any adverse effect of these other factors on the smoothness and sensitivity of the lift spoiler control.

One such other factor has to do particularly with the wing slot 20. If the air flowing through this slot were permitted to come in contact with the undersurfaces of the lift spoiler flaps this air would exert a force on the flaps tending to tilt them upwardly about their respective hinge pivots 30. Even when the wing slots are substantially closed, as shown in Fig. 2, the higher pressure of the air at the slot entrance below the wing would still exert an upward force on the rearward portion of the lift spoiler flaps resulting in an unbalanced condition of the flaps when in their neutral position and at low angles of projection above the wing. Since such forces would seriously interfere with the operation of the flaps particularly near their neutral positions, it has been found desirable to structurally separate the lift spoiler flaps completely from the wing slot. In the present arrangement this object is accomplished by providing continuous forward wall 22 for the wing slot 20 which wall extends from the rearward edge of the bottom wing covering to the rearward edge of the upper wing covering at a position rearwardly of the leading edges of the lift increasing flap and the ailerons and spacing the rearward edge of each depression 28 forwardly from the wing slot exit, as indicated by the narrow strip 39 of upper wing covering. This complete separation of the lift spoiler flap from the wing slot renders the operation of the flaps entirely independent of the effect of the slot and the condition of the slot as controlled by the inclination of the lift increasing flap and the ailerons.

A further factor affecting the smoothness and sensitivity of the lift spoiler flap control is the relatively poor effectiveness experienced in lift spoiling effect at relatively small amplitudes of lift spoiler movements when the space beneath and to the rear of the lift spoiling flap is not ventilated. This effect is particularly noticeable in an arrangement such as that illustrated where the energizing wing slot is positioned immediately to the rear of the lift spoiler flap since this slot will tend to maintain the surface flow of air over the rearward upper surface of the wing energized to a considerable extent and a small amplitude of lift spoiler flap projection will thus tend to give only a relatively small decrease in lift of the wing rather than to immediately cause a definite and appreciable decrease in lift of the portion of the wing affected by the lift spoiler. This relatively poor effectiveness at small amplitudes occasions an undesirable unevenness in control since there is at first a relatively slow decrease of the lift of the portion of the wing affected by the lift spoiler followed by a rather sudden decrease as the lift spoiler is brought to a position of greater amplitude which may be too rapid to be accurately controlled. This difficulty is overcome in the present invention by providing a controlled wing gap through the wing opening to the space beneath and to the rear of each lift spoiler flap. In the construction illustrated in the accompanying drawing, the provision of such a wing gap is conveniently accomplished by omitting a portion of the covering within the depressions 28 and 38 thus permitting air to flow from the undersurface of the wing through the interior of the wing and out of the wing upper surface beneath and to the rear of the lift spoiler flap. In the illustrated arrangement, a portion of the covering 40 constituting the bottom of the lift spoiler flap depression 28 is omitted to provide a hole or aperture 41 the edges of which are indicated at 42 and 44. A portion of the covering forming the depression 38 is also omitted to provide an aperture 46 in the bottom of the recess 38 the edges of which aperture are indicated at 48 and 50 in Fig. 3. The dimensions of the apertures 41 and 46 will be adjusted to the requirements of the particular installation and have not been found to be critical so long as they are large enough to permit a sufficient flow of air to the space beneath the lift spoiler flaps to disrupt the streamlined or stratified airflow over the lift increasing flap even at lift spoiler flap movements of small amplitudes.

By thus structurally separating the lift spoiler flaps from the wing slot and providing for the ventilation of the space beneath and to the rear of the lift spoiler flap with free air, the sensitivity and smoothness of operation of the lift spoiler flap is materially enhanced so that the flap provides a smooth and sensitive control at small amplitudes of flap movement and is more efficient at large amplitudes and the control forces are not disturbed and unbalanced by extraneous forces acting on the flap.

In Fig. 4 there is shown a modified arrangement in which the lift spoiler flap 52 is positioned entirely at the rear of the fixed wing portion and is separated from the wing slot 20 only by the fixed shield 54 carried by the fixed portion of the wing. In this arrangement the shield 54 serves the same purpose as the structural member 22 of the form of the invention shown in Figs. 1, 2 and 3 and is dimensioned so as to provide a gap between the front of the shield and the adjacent portion of the flap when the flap is projected out of its position within the wing contour as shown in full lines in Fig. 4. This flap is also provided with a balancing vane 56 which functions in the same manner as the vane 36 shown in the above-described form of the invention except that it does not necessarily control the entrance to the wing gap opening beneath and to the rear of the lift spoiler flap 52.

While a suitable mechanical arrangement has been hereinabove described and illustrated in the accompanying drawing for the purpose of disclosing the invention, it is to be understood that the invention is not limited to the particular arrangement so described and illustrated, but that changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In an aircraft wing having a relatively fixed portion, tiltable flap members hinged at the rear of said fixed portion, a wing slot between said tiltable members and said fixed portion having its rear wall constituted at least in part by the front portions of said flap members, a control flap pivoted at its forward edge in a depression in the upper surface of said fixed wing portion, and a flap balance vane receivable in a depression in the lower surface of said fixed wing portion, said depressions having openings therein constituting an air flow gap extending through said fixed wing portion, and a relatively fixed structural member having at its upper end a small chordwise dimension and constituting at least the upper portion of the forward wall of said wing slot and permanently separating the wing gap opening in said upper depression from the upper end of said wing slot, whereby air flowing from said upper surface opening when said control flap is raised will act to spoil the lift increasing effect of said wing slot.

2. The arrangement as set forth in claim 1 in which said wing gap has a spanwise extent less than the spanwise extent of said lift spoiler flap.

3. In an airplane wing having a relatively fixed forward portion, and a trailing edge flap hinged to said relatively fixed portion and separated therefrom by an upwardly and rearwardly converging reenergizing wing slot having its rear wall constituted at least in part by the front portion of said trailing edge flap, a lift spoiler flap carried by said relatively fixed portion ahead of the upper end of said slot and having its front edge pivotally connected to said fixed portion and its rear edge adjacent to the upper end of said slot, said relatively fixed wing portion having an opening in the upper surface thereof beneath said lift spoiler flap and an opening in the lower surface thereof communicating with said upper surface opening through the interior of said wing, said openings constituting a wing gap located immediately ahead of said wing slot and controlled by said lift spoiler flap, and structural means of small chordwise extent comprising at least the upper portion of the forward wall of said wing slot carried by said relatively fixed portion and separating the interior of said wing and said upper surface opening from said wing slot, whereby raising the rear edge of said lift spoiler flap will direct air from said wing gap across the upper end of said wing slot.

4. Lift control means for an airplane wing having a forward portion, and a tiltable rearward portion comprising wing flaps carried by said forward portion immediately to the rear thereof, an upwardly and rearwardly convering wing slot between said flaps and said forward portion having for its rearward wall the forward portion of said flap and for its forward wall a curved member rigidly secured at the rear of said forward wing portion, said forward wing portion having an opening in the upper surface thereof adjacent to said curved member but on the opposite side thereof from said wing slot and an opening in the lower surface thereof communicating with said upper surface opening through the interior of said wing, and a lift spoiler flap hinged at its forward edge to said forward wing portion in position to close said upper surface opening when retracted, whereby when said trailing edge flaps are tilted downwardly said wing slot will improve the lift characteristics of said wing by re-energizing the airflow over the upper surfaces of said trailing edge flaps but when said lift spoiler flap is tilted upwardly it will spoil the lift characteristics of said wing and air flowing from said upper surface opening at the upper end of said wing slot will spoil the re-energiizng effect of said slot.

5. In an aircraft wing comprising a relatively fixed forward portion, a tiltable flap carried by said forward portion and disposed immediately to the rear thereof, and an upwardly and rearwardly converging wing slot between said forward portion and said flap having a forward wall fixed relative to said relatively fixed wing portion, wing lift control means comprising, a lift spoiler flap hinged at its forward edge to said fixed wing portion in a position such that when retracted its rearward edge is adjacent to the upper end of said wing slot, said fixed wing portion having an opening in its upper surface beneath said lift spoiler flap and an opening in its lower surface connected with said upper surface opening through the interior of said wing whereby, when said lift spoiler flap is raised air flowing through said wing opening and venting near the upper end of said wing slot will spoil the re-energizing effect of said wing slot.

6. In an aircraft wing having a relatively fixed portion, a trailing edge flap hinged to said fixed portion, a wing slot between said flap and said wing portion having its rearward surface constituted by the forward portion of said flap and its forward wall constituted by a member rigidly integrated with the structure of said fixed portion extending downwardly and forwardly from the rearward edge of said fixed portion to provide an upwardly and rearwardly converging wing slot, a longitudinal recess in the upper surface of said fixed wing portion adjacent the upper end of said slot having an opening into the interior of the wing, a longitudial recess in the lower surface of said fixed wing portion also having an opening into the interior of the wing, a spoiler flap receivable in said upper recess operative to control the opening therein and a flap balance vane movable with said spoiler flap receivable in said lower recess and effective to control said lower opening, said flap and vane acting when said flap is raised to open an airflow gap through said wing to spoil the re-energizing effect of said wing slot.

7. In an aircraft wing comprising a relatively fixed forward portion, a tiltable flap carried by said forward portion and disposed immediately to the rear thereof, and an upwardly and rearwardly converging wing slot between said forward portion and said flap having a forward wall fixed relative to said relatively fixed wing portion, wing lift control means comprising, a lift spoiler flap hinged at its forward edge to said fixed wing portion in a position such that when retracted its rearward edge is adjacent to the upper end of said wing slot, said fixed wing portion having an opening in the upper surface thereof beneath said lift spoiler flap and an opening in its lower surface connected with said upper surface opening through the interior of said wing, and means movable with said lift spoiler flap controlling said bottom surface opening, whereby when said lift spoiler flap is raised air flowing through said wing openings and venting near the upper end of said wing slot will spoil the re-energizing effect of said wing slot.

PAUL S. BAKER.